United States Patent
Kizhepat et al.

(10) Patent No.: US 9,740,377 B1
(45) Date of Patent: Aug. 22, 2017

(54) AUXILIARY INFORMATION DATA EXCHANGE WITHIN A VIDEO ENVIRONMENT

(75) Inventors: Govind Kizhepat, Los Altos Hills, CA (US); Yung-Hsiao Lai, Fremont, CA (US); Erik Matthew Nystrom, Santa Clara, CA (US); Sarvesh Arun Telang, Mountain View, CA (US)

(73) Assignee: Vuemix, Inc., Santa Clara, CA (US)

( * ) Notice: Subject to any disclaimer, the term of this patent is extended or adjusted under 35 U.S.C. 154(b) by 1278 days.

(21) Appl. No.: 13/354,177

(22) Filed: Jan. 19, 2012

Related U.S. Application Data

(63) Continuation-in-part of application No. 13/237,874, filed on Sep. 20, 2011, now abandoned, which is a continuation-in-part of application No. 13/154,222, filed on Jun. 6, 2011, now Pat. No. 9,077,578.

(51) Int. Cl.
| | |
|---|---|
| G06F 15/16 | (2006.01) |
| H04N 7/12 | (2006.01) |
| G06F 3/0484 | (2013.01) |
| H04N 21/4223 | (2011.01) |
| H04N 19/107 | (2014.01) |
| G02B 27/01 | (2006.01) |

(Continued)

(52) U.S. Cl.
CPC ..... *G06F 3/04842* (2013.01); *H04N 21/4223* (2013.01); *G02B 2027/0138* (2013.01); *H04N 19/107* (2014.11); *H04N 19/61* (2014.11); *H04N 19/85* (2014.11)

(58) Field of Classification Search
CPC .... H04N 21/4223; H04N 19/61; H04N 19/85; H04N 19/107; G06F 3/04842; G02B 2027/0138

USPC .......... 709/219; 375/240.26, 240.25, 240.24, 375/240.29
See application file for complete search history.

(56) References Cited

U.S. PATENT DOCUMENTS

| | | |
|---|---|---|
| 5,408,274 A | 4/1995 | Chang |
| 5,513,181 A | 4/1996 | Bresalier |
| 5,594,507 A | 1/1997 | Hoarty |

(Continued)

FOREIGN PATENT DOCUMENTS

EP    2343891 A2    7/2011

OTHER PUBLICATIONS

K. Sugita and M. Yokota, "An Implementation and Experimentation of a Composite Video Streaming," Advanced Information Networking and Applications Workshops, 2007, AINAW '07. 21st International Conference on, Niagara Falls, Ont., 2007, pp. 971-976.*

(Continued)

*Primary Examiner* — Taylor Elfervig
(74) *Attorney, Agent, or Firm* — Adams Intellex, PLC

(57) ABSTRACT

A composite video including a plurality of videos in a single stream is sent from a video streamer server to a client, where it is presented on an electronic display. A user may make a selection in the composite video that is translated to an absolute media reference that may include information identifying which video of the composite video was selected, an absolute media time identifying an elapsed time from the beginning of the video to the selection, and/or an absolute media spatial coordinate identifying a spatial location of the video that was selected. Auxiliary information related to the composite video may be obtained based on the selection and the absolute media reference and displayed to the user.

27 Claims, 8 Drawing Sheets

(51) Int. Cl.
*H04N 19/85* (2014.01)
*H04N 19/61* (2014.01)

(56) References Cited

U.S. PATENT DOCUMENTS

| | | | |
|---|---|---|---|
| 5,623,308 | A | 4/1997 | Civanlar et al. |
| 5,691,768 | A | 11/1997 | Civanlar |
| 5,872,874 | A | 2/1999 | Natarajan |
| 5,959,639 | A | 9/1999 | Wada |
| 6,034,678 | A | 3/2000 | Hoarty |
| 6,064,377 | A | 5/2000 | Hoarty |
| 6,100,883 | A | 8/2000 | Hoarty |
| 6,205,582 | B1 | 3/2001 | Hoarty |
| 6,253,238 | B1 | 6/2001 | Lauder |
| 6,748,020 | B1 | 6/2004 | Eifrig et al. |
| 6,925,499 | B1 | 8/2005 | Chen et al. |
| 6,931,660 | B1 | 8/2005 | Kalluri |
| 7,027,516 | B2 | 4/2006 | Anderson et al. |
| 7,028,096 | B1 | 4/2006 | Lee |
| 7,039,784 | B1 | 5/2006 | Chen et al. |
| 7,127,619 | B2 | 10/2006 | Unger |
| 7,324,555 | B1 | 1/2008 | Chen et al. |
| 7,408,961 | B2 | 8/2008 | Kaku |
| 7,499,416 | B2 | 3/2009 | Polomski |
| 7,516,136 | B2 | 4/2009 | Lee |
| 7,516,243 | B2 | 4/2009 | Wee |
| 7,543,326 | B2 | 6/2009 | Moni |
| 7,555,006 | B2 | 6/2009 | Wolfe |
| 7,555,718 | B2 | 6/2009 | Girgensohn |
| 7,634,795 | B2 | 12/2009 | Dureau |
| 7,636,395 | B2 | 12/2009 | Yongfang |
| 7,647,413 | B2 | 1/2010 | Kirkland |
| 7,675,873 | B2 | 3/2010 | Krstulich |
| 7,676,590 | B2 | 3/2010 | Silverman |
| 7,698,365 | B2 | 4/2010 | Van Buskirk |
| 7,720,023 | B2 | 5/2010 | Bais |
| 7,734,692 | B1 | 6/2010 | Kaplan |
| 7,738,766 | B2 | 6/2010 | Silverman |
| 7,778,206 | B2 | 8/2010 | Shaffer |
| 7,783,767 | B2 | 8/2010 | Collazo |
| 7,792,062 | B1 | 9/2010 | Fandrianto |
| 7,836,193 | B2 | 11/2010 | Ducharme |
| 7,864,808 | B2 | 1/2011 | Krause |
| 7,873,972 | B2 | 1/2011 | Zaslavsky et al. |
| 7,903,815 | B2 | 3/2011 | Bacon |
| 8,078,729 | B2 | 12/2011 | Kozat et al. |
| 8,127,058 | B1 | 2/2012 | Sha et al. |
| 8,156,236 | B2 | 4/2012 | Costanzo et al. |
| 8,250,617 | B2 | 8/2012 | Hensgen et al. |
| 8,254,455 | B2 | 8/2012 | Wu et al. |
| 8,582,656 | B2 | 11/2013 | Lin et al. |
| 8,619,874 | B2 | 12/2013 | Lin et al. |
| 8,731,053 | B2 | 5/2014 | Karegoudar |
| 2003/0146915 | A1* | 8/2003 | Brook et al. ............ 345/473 |
| 2004/0060061 | A1* | 3/2004 | Parker ............ H04N 5/44591 725/38 |
| 2005/0008240 | A1 | 1/2005 | Banerji |
| 2005/0137958 | A1 | 6/2005 | Huber et al. |
| 2006/0179469 | A1 | 8/2006 | Fransman et al. |
| 2007/0028288 | A1 | 2/2007 | Sigmon, Jr. et al. |
| 2007/0200923 | A1 | 8/2007 | Eleftheriadis |
| 2007/0204302 | A1 | 8/2007 | Calzone |
| 2008/0036917 | A1* | 2/2008 | Pascarella ............ G11B 27/11 348/702 |
| 2008/0127272 | A1 | 5/2008 | Cragun et al. |
| 2008/0162713 | A1 | 7/2008 | Bowra et al. |
| 2008/0170622 | A1 | 7/2008 | Gordon |
| 2008/0178249 | A1 | 7/2008 | Gordon |
| 2009/0041118 | A1 | 2/2009 | Pavlovskaia et al. |
| 2009/0123123 | A1 | 5/2009 | Piesing |
| 2009/0158337 | A1* | 6/2009 | Stiers ............ H04N 5/44591 725/44 |
| 2009/0327893 | A1* | 12/2009 | Terry ............ G06F 3/1438 715/719 |
| 2010/0122294 | A1* | 5/2010 | Craner ............ H04N 5/44543 725/41 |
| 2010/0141833 | A1 | 6/2010 | Lemmers |
| 2010/0158109 | A1 | 6/2010 | Dahlby et al. |
| 2011/0102671 | A1 | 5/2011 | Tsai |
| 2011/0107379 | A1* | 5/2011 | Lajoie et al. ............ 725/87 |
| 2011/0145865 | A1 | 6/2011 | Simpson |
| 2011/0158113 | A1 | 6/2011 | Nanda |
| 2011/0200093 | A1* | 8/2011 | Gabara et al. ............ 375/240.01 |
| 2011/0231878 | A1 | 9/2011 | Hunter et al. |
| 2011/0249026 | A1* | 10/2011 | Singh ............ 345/630 |
| 2012/0194742 | A1* | 8/2012 | Barnes ............ H04N 5/44513 348/569 |
| 2012/0257112 | A1* | 10/2012 | Fritsch ............ 348/580 |
| 2013/0019261 | A1 | 1/2013 | Huber et al. |

OTHER PUBLICATIONS

Jens Brandt and Lars Wolf. 2008. Adaptive video streaming for mobile clients. In Proceedings of the 18th International Workshop on Network and Operating Systems Support for Digital Audio and Video (NOSSDAV '08). ACM, New York, NY, USA, 113-114.*

M. Krause, "Experiment on Multiple Video Streaming in Wireless Home Networks," 2008 4th International Conference on Wireless Communications, Networking and Mobile Computing, Dalian, 2008, pp. 1-5.*

"A Guide to MPEG Fundamentals and Protocol Analysis: Updated with QoS/QoE Diagnostics and Troubleshooting Primer", Copyright © 2012, Tektronix, Inc., http://www.tek.com/video-test.

U.S. Appl. No. 13/369,169, filed Feb. 8, 2012, entitled "Video Transcoder Stream Multiplexing Systems and Methods".

VBrick, "MPEG-2 Transport vs. Program Stream," VBrick Systems Inc., Wallingford, CT, p. 1-10, 2007.

Magnum Semiconductor, "DX7313," Magnum Semiconductor, Milpitas, CA, p. 1-2; downloaded from www.magnumsemi.com on Jun. 2, 2011.

VIXS, "Broadcast Professional Series," ViXS Systems, Toronto, Ontario, p. 1-2; downloaded from www.vixs.com on Jun. 2, 2011.

Chang et al., "Manipulation and Compositing of MC-DCT Compressed Video," IEEE J. Selected Areas in Comm., IEEE Communications Society, New York, NY, 13(1):1-11, Jan. 1995.

Chang, "Compositing and Manipulation of Video Signals for Multimedia Network Video Services," Ph. D Thesis, University of California Berkeley, Berkeley, CA, p. 1-212, 1993.

ITU-T, "H.264 (Mar. 2010), Advanced video coding for generic audiovisual services," Telecommunication Standardization Sector of ITU, Geneva, Switzerland, p. 1-676, Mar. 2010.

* cited by examiner

AUXILIARY INFORMATION DATA EXCHANGE WITHIN A VIDEO ENVIRONMENT

RELATED APPLICATIONS

This application is a continuation-in-part of U.S. patent application "Single Stream Generation for Multiple Independent Videos" Ser. No. 13/237,874, filed Sep. 20, 2011 which is a continuation-in-part of U.S. patent application "Scalable Real-Time Video Compositing Systems and Methods" Ser. No. 13/154,222, filed Jun. 6, 2011. Each of the foregoing applications is hereby incorporated by reference in its entirety.

FIELD OF INVENTION

This application relates generally to video streaming of multiple videos and more particularly to auxiliary information data exchange within a video environment.

BACKGROUND

Streaming of video content remains a complex and difficult technical challenge. From locating videos, to head-end storage of video content, to the delivery of the requested videos, all aspects of the video streaming system must be carefully designed and implemented. The complex delivery problem is further complicated when multiple videos may be of interest to the requester or to a viewer. Again, careful techniques and algorithms must be developed in order for proper searching and for content delivery to be efficient, timely, and effective. Complex software and hardware systems are required to implement a video collection and delivery system. In such a system, the software may be stored and executed on a variety of processors.

There may be many challenges involved in a complex, user-driven, video content delivery system. For example, one difficulty might be to effectively and efficiently locate video content on the web. The results of the search may be presented as text or as still images and may include uniform resource locators (URL) for the various videos. A user may then be able to view a video by selecting a particular result returned by the search. A browser or other web enabled application may use the URL provided by the search to contact the source of the video. The source of the video may then stream the video to the user.

A typical modern personal computer may be capable of displaying more than one video simultaneously. A typical user that wants to have multiple videos playing on their computer screen simultaneously may open multiple windows of their browser and enter a different URL into each browser window so that each browser window may show a different video. Each browser window may create its own connection to a server, which may be different for the different videos, and receive its own separate video stream.

There are many sources of information about video available to a user via the internet. One example is the Internet Movie Database, www.imdb.com, although many other sources of information are available. A user may open another browser window and go to a particular information website and type in the name of the video to retrieve various types of information about a video.

SUMMARY

Various methods, apparatus, computer program products, and systems may display videos and provide additional information on the videos. A computer implemented method for video presentation is disclosed comprising: receiving a single stream from a video streamer wherein the single stream includes a composite video; receiving a selection with regards to the composite video; translating the selection to an absolute media reference; and providing auxiliary information based on the selection and the absolute media reference. The absolute media reference may include one of an absolute media time and an absolute media spatial coordinate. The composite video may include at least one of a temporal composite video and a spatial composite video. The absolute media reference may include an absolute media spatial coordinate for an original video within the composite video. The auxiliary information may be based on the absolute media spatial coordinate. The single stream may include a non-linear playback of video content. The selection may include one of a user clicking on and the user mousing over, a presentation of the composite video on an electronic display. The single stream may be received on a client machine. The method may further comprise presenting the composite video on an electronic display. The absolute media reference may include an absolute media time for an original video within the composite video. The auxiliary information may be based on the absolute media time.

The translating may be accomplished using a client. The auxiliary information may be obtained by a client-server interaction. The client-server interaction may comprise: receiving, by a server, a message including information based on the selection, wherein the translating is accomplished using the server and the information based on the selection; obtaining, by the server, the auxiliary information from a second server based on the absolute media reference; and providing, by the server, the auxiliary information to a client. The server may include the video streamer. The information in the message may include an elapsed time across a sequence of videos from the composite video. The information in the message may include a spatial coordinate from the composite video. The composite video may include a non-linear playback of at least one video. The client-server interaction may comprise: receiving, by a client from a server, a translation mapping; translating, by the client, from a composite video reference to an absolute media reference using the translation mapping; and obtaining, from a second server, the auxiliary information.

The composite video reference may include an elapsed time and the absolute media reference may include an absolute media time. The composite video reference may include a spatial coordinate from the composite video and the absolute media reference may include an absolute spatial coordinate. The obtaining the auxiliary information may comprise a request by the client to the second server. The auxiliary information may include at least one of a URL, a video, a group of videos, an advertisement, social media, a search query, a purchase page, information related to the composite video, information on a character, information on a place, information on a product, information on a service, a commentary on a video, statistics on a sporting event, and statistics on an athlete. The method may further comprise performing an action based on the selection and the absolute media reference. The action may include at least one of providing a purchase page, requesting further videos, providing information related to the composite video, providing information on a video within the composite video, providing information on a character within the composite video, providing information on a place shown within the composite video, and providing information on a product shown within the composite video. The single stream may include a plurality of active videos via a single video stream from the video streamer wherein the plurality of active videos play simultaneously. The selection may apply to one of the plurality of active videos. The selection may apply to a spatial coordinate within one video of the plurality of active videos. The composite video may be dynamically generated by the video streamer. The auxiliary information may be presented as text overlaid on at least one video of the composite video. The auxiliary information may be presented in a pop-up window.

In embodiments, a computer implemented method of video presentation may comprise: providing, to a client, a single stream wherein the single stream includes a composite video; receiving, from the client, a message including information based on a selection made on the client; translating the information included in the message to an absolute media reference; and providing auxiliary information, to the client, based on the message and the absolute media reference. In some embodiments, a computer program product to present video, the computer program product embodied in a non-transitory computer readable medium, may comprise: code for receiving a single stream from a video streamer wherein the single stream includes a composite video; code for receiving a selection with regards to the composite video; code for translating the selection to an absolute media reference; and code for providing auxiliary information based on the selection and the absolute media reference. In embodiments, a computer system to present video may comprise: a memory which stores instructions; and one or more processors attached to the memory wherein the one or more processors, when executing the instructions which are stored, are configured to: receive a single stream from a video streamer wherein the single stream includes a composite video; receive a selection with regards to the composite video; translate the selection to an absolute media reference; and provide auxiliary information based on the selection and the absolute media reference.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
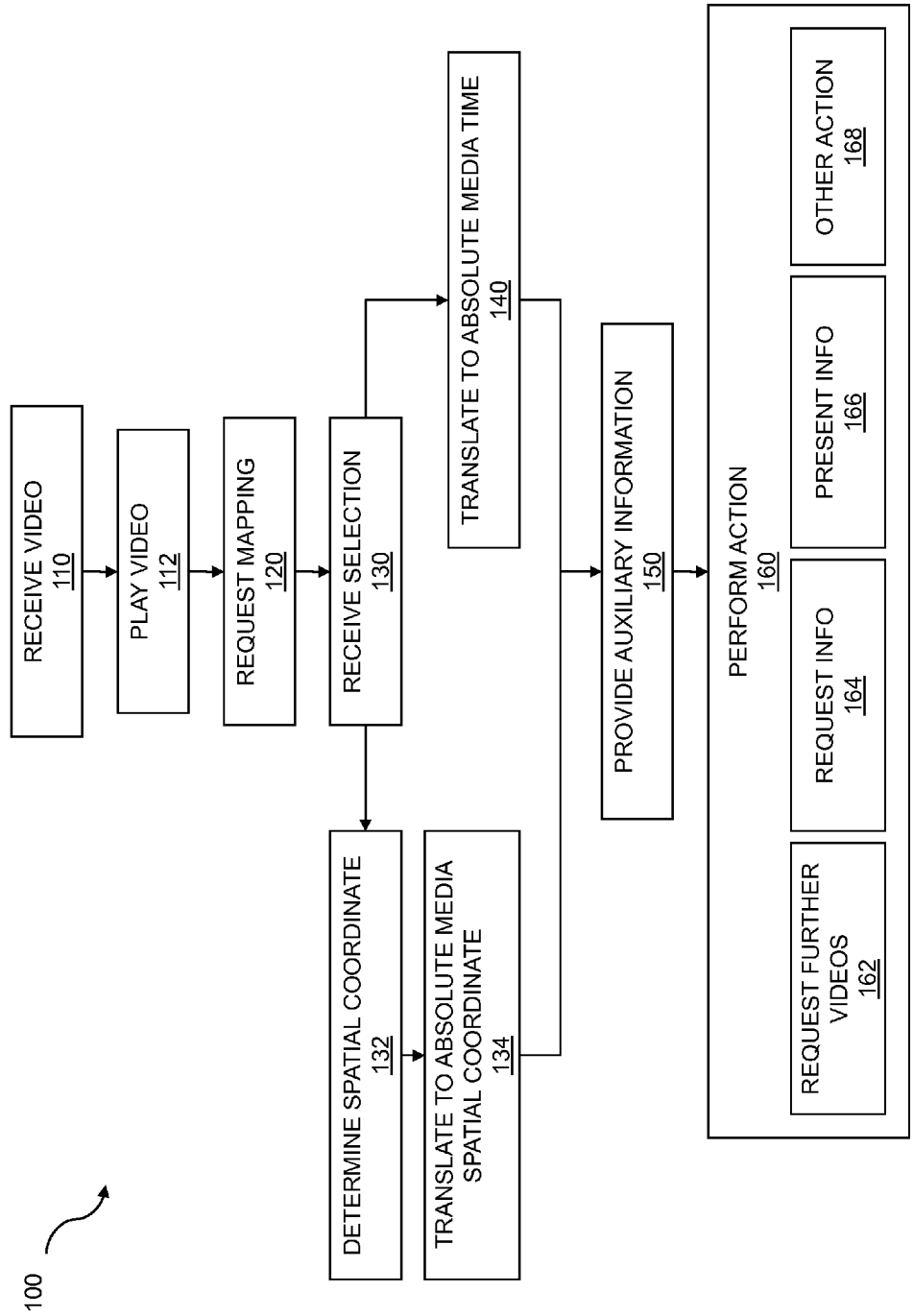
FIG. 1 is a flow diagram of video and information presentation.

The present disclosure provides a description of various methods, apparatus, computer program products, and systems for providing auxiliary information about one or more active videos that may be simultaneously presented. As more and more content is delivered across the internet in video form, providing a viewer with auxiliary information about the video in a seamless manner becomes ever more important. It is also important that the auxiliary information be presented in a dynamic fashion to meet a viewer's desire for the information. Further, content owners and advertisers have auxiliary information from which viewers may benefit and which may be pushed to viewers. This information presentation becomes even more important when multiple videos are being shown to the user. Displaying auxiliary information about all the active videos whenever information about one of the videos is requested would be distracting or would utilize more display area than is desirable.

In accordance with the present disclosure, multiple active videos may be displayed from a composite video. In some embodiments, the multiple active videos may be included in a single video stream. Some of the videos may be displayed simultaneously in separate windows, but in some embodiments, multiple videos may be shown simultaneously in separate tiles of a single video window and/or multiple videos may be shown consecutively in a single tile of a window. The multiple videos may be shown in a cascaded playback. The client may not have all possible information about the videos that are being shown. Further, there may simply be more videos for display that are returned in response to a search. So if the user wants to receive auxiliary information about one video and indicates that by making a selection, which may include clicking on the video using a mouse, moving the mouse over the video (which may be referred to as mousing over the video), touching a screen, or otherwise making a selection with a mouse, keyboard, touch screen, or other human input device, the video being selected is determined and the auxiliary information displayed. In some embodiments, a portion of the video may be identified by the selection.

The video stream may be played with a typical media player on a client machine such as RealPlayer™, Windows Media Player™, a web browser with video capability (such as a Flash™ plug in), or the like. Since the multiple videos may be included in a single video stream, such typical media players can play the single video stream, resulting in the multiple videos being seen by a user. In other embodiments, a specialized video player may be utilized. In some embodiments, multiple videos may be simultaneously displayed in separate tiles within a window but some embodiments may present multiple videos presented consecutively in a single tile or window.

If a selection is made, the selected video is determined based on one or more of the location of the selection, the time of the selection, the location and size of the windows and/or tiles showing videos, and the sequence of videos being shown in the various tiles. Once the selected video is determined, auxiliary information about the video may be displayed.

FIG. 1 is a flow diagram 100 of video and information presentation. The flow 100 describes a computer implemented method of video presentation. The video presentation may occur on a single client computer, although in some embodiments, multiple computers may perform various aspects of the video presentation. The flow 100 may be implemented as a computer program product including code embodied in a non-transitory computer readable medium in some embodiments. The flow 100 may begin by receiving video 110. Receiving video may include receiving a single stream from a video streamer wherein the single stream includes a composite video. The video may be received over a network that may include one or more sub-networks having various physical and/or software protocols. Examples of types of networks that may be used for the various sub-networks include, but are not limited to, various wired networking protocols such as ethernet IEEE 802.3, various radio frequency computer networking protocols such as WiFi IEEE 802.11, various optical networking protocols such as synchronous optical networking (SONET) ANSI T1.105, various wireless telephony data networks, various power line networking protocols, or any other data communication protocol, and may include networks that may be referred to as "the internet" or "the web."

The flow 100 may continue with playing video 112. The single stream may include multiple videos in a composite video. Some of the multiple videos of the composite video may be encoded into different tiles within the video frame so that the videos can be presented simultaneously. In some embodiments, the single video stream may include a series of concatenated videos that result in the playing of multiple videos in sequence. Some of the multiple videos may be concatenated within a tile so that some of the videos are consecutively shown. Because the single stream may contain multiple videos that may be shown at different spatial locations and/or different temporal locations within the single stream, a request for mapping 120 of which videos are located at what position at what elapsed time may be made over the network. The mapping may then be received over the network and saved for later use.

The flow 100 continues by receiving a selection 130 with regards to the composite video. The selection may originate from a user clicking on the composite video using a mouse, mousing over the composite video, a touch screen, or otherwise making a selection with a mouse, keyboard, touch screen, or other human input device. The selection may include a spatial coordinate based on the display, or a window where the composite video is being presented. The selection may also include a time that may be a clock time or an elapsed time since the composite video started playing. The elapsed time may be expressed as a number of frames in some embodiments rather than as a standard time unit such as seconds. The selection may be used, along with the mapping in translating the selection to an absolute media reference. In some embodiments, the absolute media reference includes one of an absolute media time and an absolute media spatial coordinate.

In embodiments where an absolute media spatial coordinate is included, the flow 100 continues to determine the spatial coordinate 132. This may occur by receiving positional information from the human input device, such as a mouse. In many embodiments, a driver for the human input device may provide spatial coordinates directly, but in other embodiments the spatial coordinates may be calculated based on relative movements of the human input device or other parameters returned by the human input device. The spatial coordinates may be relative to a virtual display area, of which the visual display is a portion. In other embodiments, the spatial coordinates may be relative to a display or to a window within the display. The spatial coordinates may be translated to absolute media spatial coordinates 134 by first converting the spatial coordinates to coordinates within the window that is displaying the composite video and then using the mapping to translate the coordinates within the window to absolute media spatial coordinates.

The mapping may include information about the spatial arrangement of the original videos in the composite video. Depending on the embodiment, the information may explicitly identify pixel coordinates of the corners of the display area for each original video, or may implicitly identify where the original videos are displayed by identifying pre-determined tile numbers or which quadrant of the composite video is used for the original video, or some other technique. So by using the spatial coordinates of the selection, along with the mapping, it may be determined which original video was selected. The information identifying the selected video may be included in the absolute media reference.

In some embodiments, the absolute media reference may directly identify which original video within the composite video was selected and an absolute media spatial coordinate may be included to indicate a coordinate or region from within the tile that was selected so that the absolute media reference includes an absolute media spatial coordinate for an original video within the composite video. This may be used to identify a particular pixel or area of the original video that is selected.

In some embodiments the absolute media reference includes an absolute media time for an original video within the composite video. The auxiliary information may be based on the absolute media time. The selection may include an elapsed time since the beginning of the composite video, although some embodiments may use a start time of the composite video along with a clock time of the selection to determine an elapsed time. The mapping may be used to translate the time of the selection to an absolute media time 140. The mapping may include information such as the length of the original videos of the composite video, and a play-list for a particular tile within the composite video. The information from the mapping may be used to determine the absolute media time which may be the time from the beginning of the original video to the time of the selection.

As an example of how the mapping may work, a single stream may include a composite video that is 1920×1080 pixels in size and includes a new frame 30 times each second. The mapping may include information that tile 1 is 1280×720 and has its upper left corner at position (0,180) of the composite video, where (0,0) is the upper left corner of the composite video. Tile 2 is 640×480 pixels with its upper left corner at (1280,0) and tile 3 is 640×480 with its upper left corner at (1280,600). The mapping may also include a playlist for the three tiles that may include a video identifier and length for each video in the playlist. The playlist may repeat after completion so that a playlist with a single video may simply play that video repeatedly. As an example, the mapping may include information indicating that tile 1 has a playlist of a single video1 that is 632 seconds long. The playlist for tile 2 includes video2 lasting 60 seconds followed by video3 lasting 195 seconds and the playlist for tile 3 includes video4, video5 and video6 which are all 30 seconds long.

If a selection is received that indicates that the mouse was clicked at pixel (1451,910) within the composite video at frame 15215, the mapping may be used to determine that the selection occurred at pixel (171,310) of tile 3. Since frame 15215 is 5 frames past 507 seconds, and the videos of tile 3 repeat every 90 seconds, the selection occurred at 57+ seconds into the sixth repetition of the videos, which is 27+ seconds from the beginning of video5. So in the example shown, the absolute video reference may include one or more of information identifying video5, an absolute media spatial coordinate of (171,310), and/or an absolute media time of 27 seconds plus 5 frames. Some embodiments may not use the full resolution of the video for the absolute media spatial coordinates such as only indicating that the absolute media spatial coordinate is the lower left quadrant, and/or may round or truncate the absolute media time to the nearest second, minute or other time period.

The flow 100 continues by providing auxiliary information 150 based on the selection and the absolute media reference. The auxiliary information may include any type of information, including, but not limited to, a URL, a video, a group of videos, an advertisement, social media, a search query, a purchase page, information related to the composite video, information on a character, information on a place, information on a product, information on a service, a commentary on a video, statistics on a sporting event, and statistics on an athlete. In some embodiments the auxiliary information is determined based on an identifier of the original video, such as a movie title, without using an absolute media time or an absolute media spatial coordinate. In other embodiments, the auxiliary information is based on the absolute media spatial coordinate, such as the absolute media spatial coordinate corresponding to the location of a "BUY" button that is in a fixed location for the entire duration of the video, where a purchase page is displayed in response to the selection. In some embodiments, the auxiliary information is based on the absolute media time, such as for example displaying statistics of a sporting event if the absolute media time indicates a time 3 seconds from the end of the video, as a screen is displayed for the last 10 seconds of a video of the sporting event saying "Click for Statistics." In some embodiments, the video identifier, the absolute media spatial coordinate and the absolute media time may all be used to determine the auxiliary information, such as displaying information on the actor that is selected as he appears in a particular location at a particular time in the video.

In some embodiments flow 100 continues by performing an action 160 based on the selection and absolute media reference. The action may be any type of action and may be limited to the local computer or may involve interacting with other computers over the network. In various embodiments the further action may include at least one of providing a purchase page, requesting further videos 162, providing information related to the composite video, providing information on a video within the composite video, providing information on a character within the composite video, providing information on a place shown within the composite video, and providing information on a product shown within the composite video. Some embodiments may include an action such as requesting information 164, presenting information 166 or taking other action 168 that may or may not be related to the composite video.

Figure 2:
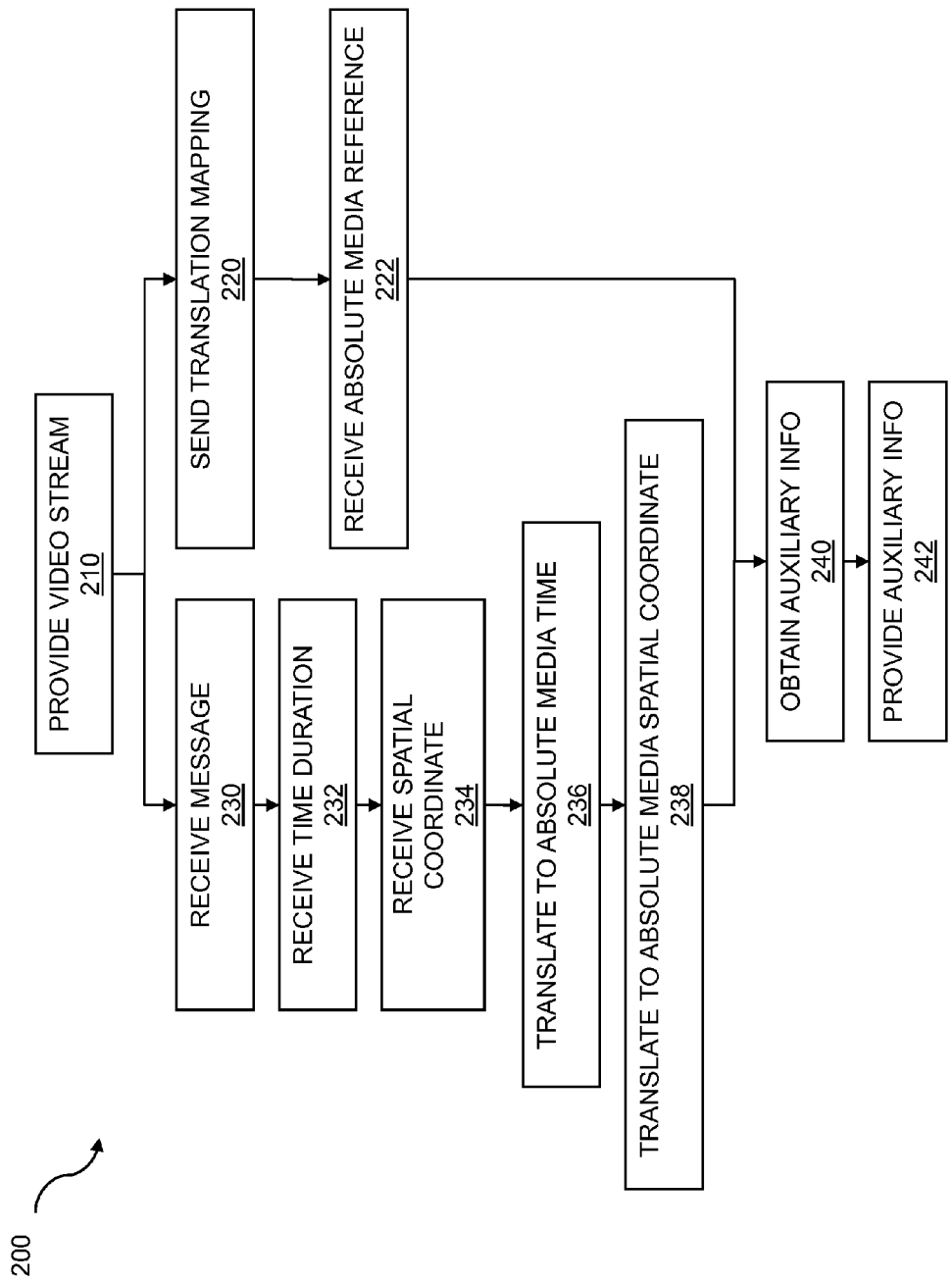
FIG. 2 is a flow diagram of providing a video stream with auxiliary information.

FIG. 2 is a flow diagram 200 of providing a video stream with auxiliary information. The flow 200 describes a computer implemented method for video and information provision. The flow 200 may occur on a single server computer, although in some embodiments, multiple computers may perform various aspects of providing a video stream with auxiliary information. The server may interact with other computers, such as a client computer. The flow 200 may be implemented as a computer program product including code embodied in a non-transitory computer readable medium in some embodiments. The flow 200 may begin by providing a video stream 210. In some embodiments, this may involve providing, to a client, a single stream wherein the single stream includes a composite video.

In some embodiments the client may translate the selection to the absolute media reference as described in FIG. 1 so that the translating is accomplished using the client. In such embodiments, the server may send the translation mapping 220 to the client to provide information that may be used by the client as described above. The server may receive the absolute media reference 222 from the client if the client performs the translation.

In other embodiments, the server may create the absolute media reference. Such embodiments may include receiving, from a client, a message 230 including information based on a selection made on the client. The information in the message may include information based on the selection, such as a time duration since the start of the composite video, and/or a spatial coordinate within the composite video. In some embodiments, the information in the message includes an elapsed time across a sequence of videos from the composite video. In embodiments, information in the message includes a spatial coordinate from the composite video. So the server may receive the time duration 232 and receive the spatial coordinate 234.

The flow 200 may continue with the server translating the information included in the message to the absolute media reference, such as translating to the absolute media time 236 and/or translating to the absolute media spatial coordinate 238. The server may use the time duration and/or the spatial coordinate in much the same way as described above, with the translation mapping, to translate to the absolute media reference. Thus, flow 200 may include receiving, by the server, a message including information based on the selection, wherein the translating is accomplished using the server and the information based on the selection.

Auxiliary information may be obtained 240. The auxiliary information may be any type of information as described above, but in many embodiments is information related to the composite video. In some embodiments, the server may have a database storing varied auxiliary information, but in some embodiments, flow 200 may include obtaining, by the server, the auxiliary information from a second server based on the absolute media reference. Once the auxiliary information has been obtained, the flow 200 may include providing, by the server, the auxiliary information 242 to the client or, in other words, may include providing auxiliary information, to a client, based on the message and the absolute media reference.

Figure 3:
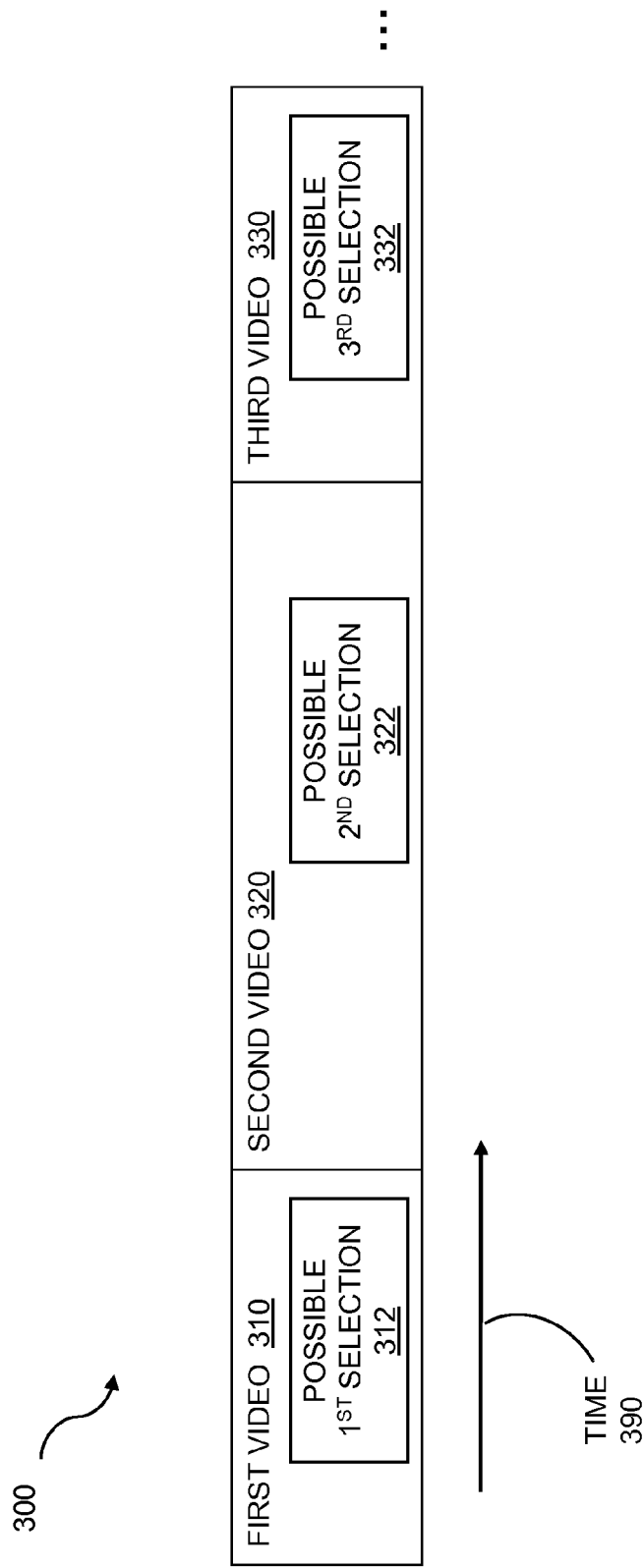
FIG. 3 is a diagram showing a video stream with selections for concatenated videos.

FIG. 3 is a diagram showing a video stream 300 with selections for concatenated videos. Time 390 flows from left to right in FIG. 3. The video stream 300 may be a composite video that may be included in a single stream sent from a video streamer to a client computer. In the example shown, the video stream 300 includes a first video 310, a second video 320, and a third video 330 concatenated sequentially together so that the second video 320 commences after the completion of the first video 310 and the third video 330 commences after the completion of the second video. In some embodiments, the video stream 300 ends after the third video 330 or may continue with other videos, but in other embodiments, the three videos may repeat to that the first video 310 commences again after the completion of the third video 330. In some embodiments, the single stream includes a non-linear playback of video content. The various videos of the video stream may be clips from a longer video and they may be played back with other clips missing or out of order.

A possible first selection 312 may be made during the time that the first video is being presented. If the possible first selection 312 is made, the selection may be translated to an absolute media reference that includes information identifying the first video 310 and may include an absolute media time indicating the time from the start of the first video 310 to the selection and an absolute media spatial coordinate indicating where in the frame of the video the selection took place. Likewise, if the possible second selection 322 is made, it may be translated to an absolute media reference including an identifier of the second video 320 and if the possible third selection 332 is made, it may be translated to an absolute media reference including an identifier of the third video 330.

Figure 4:
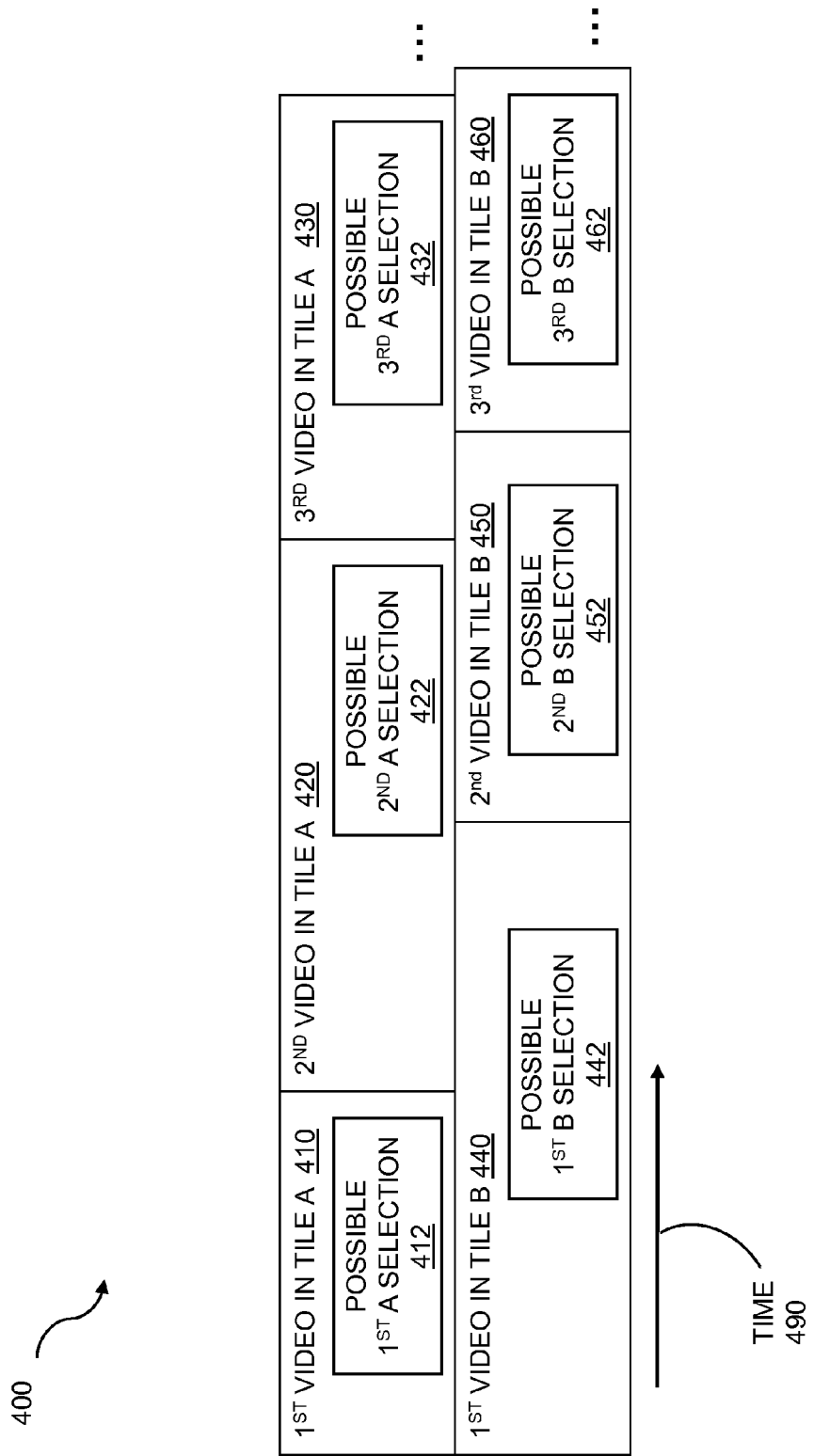
FIG. 4 is a diagram showing a video stream with selections for multiple simultaneous videos.

FIG. 4 is a diagram showing a video stream 400 with selections for multiple simultaneous videos. Time 490 flows from left to right in FIG. 4. The video stream 400 may be a composite video that may be included in a single stream sent from a video streamer to a client computer. In the example shown, the video stream 400 includes two simultaneous video sequences that may be encoded into different tiles of the video stream 400. The first video sequence which includes a first video 410, a second video 420 and a third video 430 concatenated together sequentially may be encoded into tile A, while the second video sequence which includes a first video 440, a second video 450 and a third video 450 concatenated together sequentially may be encoded into tile B. In some embodiments, the video sequences end after the third video 330 or may continue with other videos, but in other embodiments, the sequences may both repeat so that the first video 410 commences after the completion of the third video 430 in tile A and the first video 440 commences after the completion of the third video 460 in tile B.

So the composite video may include at least one of a temporal composite video and a spatial composite video, where the temporal composite video may refer to sequential videos in the same tile, and the spatial composite videos may refer to simultaneous videos in different tiles, and in some embodiments the single stream includes a plurality of active videos via a single video stream from the video streamer wherein the plurality of active videos play simultaneously. In some embodiments, the composite video includes a non-linear playback of at least one video.

A user may make a selection in the window presenting the video stream 400. Possible selections include the possible first selection 412 in tile A, the possible second selection 422 in tile A, the third possible selection 432 in tile A, the possible first selection 442 in tile B, the possible second selection 452 in tile B, and the third possible selection 462 in tile B depending on the time of the selection and the spatial coordinates of the selection. The selection may be translated to an absolute media reference including information about the selected video, so the selection applies to one of the plurality of active videos in some embodiments. The absolute media reference may include an absolute media spatial coordinate as described earlier, so the selection applies to a spatial coordinate within one video of the plurality of active videos in some embodiments.

Figure 5:
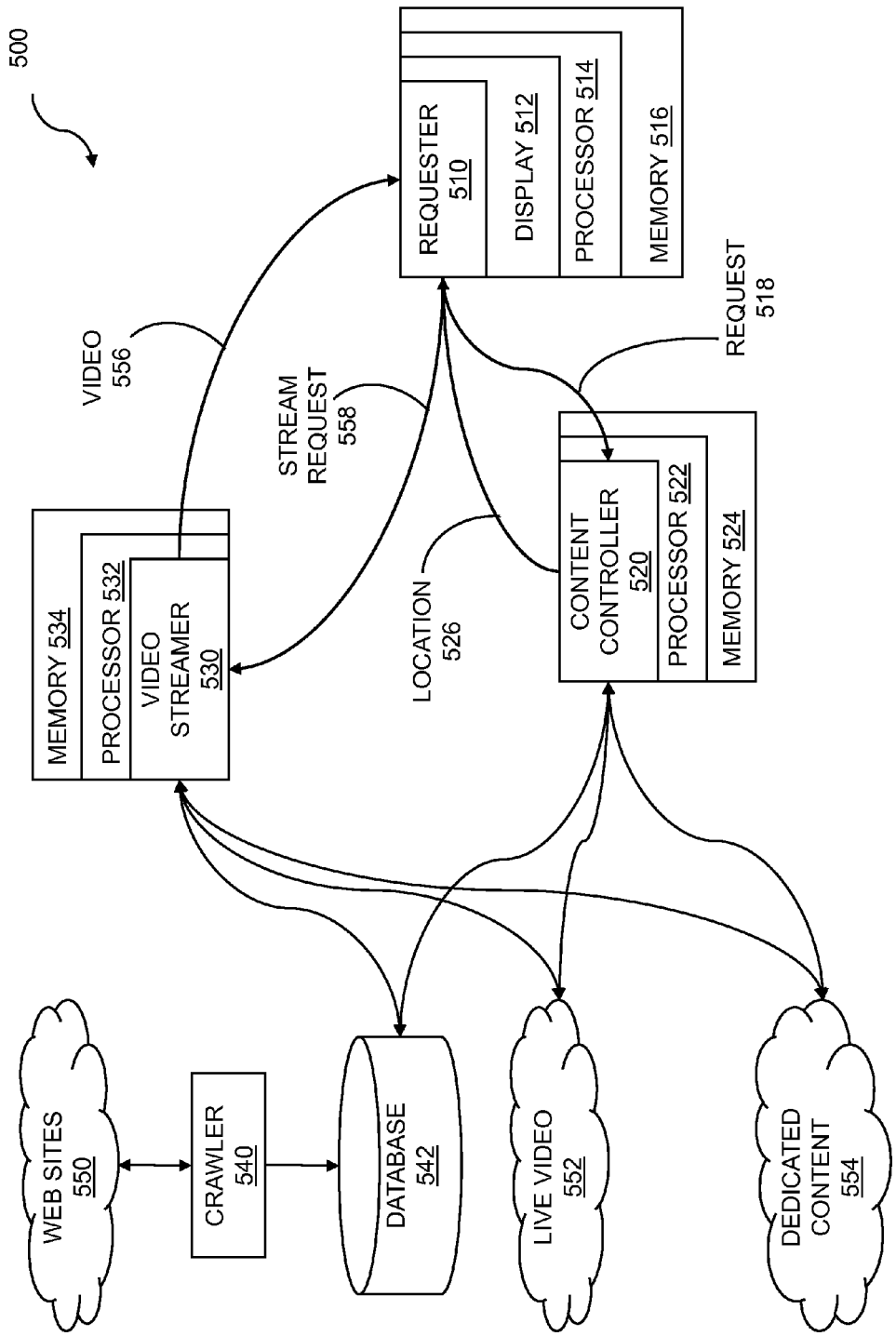
FIG. 5 is a system diagram for handling videos.

FIG. 5 is a system diagram for handling videos where the system includes a searching capability for videos. A system 500 includes a requester 510, a content controller 520, a video streamer 530, a database 542, and a crawler 540. A requester 510 may be a computer system to present video, such as a client machine, a personal computer, a set top box, a television, or some other electronic device in some embodiments. In other embodiments the client machine may be a mobile device such as a smart phone, tablet, personal digital assistant (PDA), or the like. The requester 510 may have one or more viewers or users who view videos on one or more displays 512. The requester 510 may include one or more processors 514 attached to the memory 516. The one or more processors 514, when executing instructions which are stored in the memory 516 may perform various functions such as the flow 100 of FIG. 1. The memory 516, which stores instructions, may be also be used for temporary video and audio storage, for system support, and the like. A viewer may take action, such making an selection using a mouse, keyboard, and/or touch screen, that may cause the requester 510 to send a request 518 for information to a content controller 520. The content controller 520 may receive the request 518 for video content and access databases for the video information. The request 518 may travel through various networks including either or both wireless and wired connections and may traverse the Internet. The request 518 may be a search query or some other request for an alert or other information related to videos.

The content controller 520 may be a server machine and may have one or more processors 522 which may execute instructions stored in one or more memories 524. The memory 524 may be used for storing instructions, for temporary storage, for system support, and the like. The content controller 520 may send queries and obtain responses from various repositories which contain videos or information on videos. Based on the responses which the content controller 520 receives from the repositories, a location 526 may be sent back to the requester 510. The requester 510 may receive the location 526 in response to the request 518. The location may include a uniform resource locator (URL) where the requester 510 machine can find videos. The location may include a group of video identifiers associated with videos which are relevant to the request 518 which the requester 510 sent to the content controller 520. A URL may include the video identifiers as part of the address which is sent for the location 526. In some embodiments, the location 526 may be sent directly to a video streamer 530 by the content controller 520. In some embodiments, the content controller 520 and the video streamer 530 may be part of the same machine or server so that the server includes the video streamer 530, and the content controller 520 and the video streamer 530 may share processors and/or memories.

The repositories for videos or video information may include one or more databases 542, live feed videos 552, dedicated content 554, and the like. Live video 552 may include broadcast, cable, and other televised materials that may include video of action being delivered in near real time with the action taking place and/or may include video that has been recorded or stored and is being delivered at a later time than the action occurred. Live video 552 may include web camera, security feeds, and other cameras from a variety of locations that may be delivered as it is captured or may have been captured at an earlier time. Dedicated content 554 may include videos provided by advertisers, educators, commercial companies, non-profits, and other sources of video material. In some embodiments, dedicated content 554 may include subscriber oriented web portals, such as Netflix™, Hulu™, and the like. So the plurality of active videos includes live video in some embodiments, including embodiments where the plurality of active videos includes broadcast video and embodiments where the plurality of active videos includes cable television video.

A web crawler 540 may obtain video information from across the Internet as well as, in some cases, an intranet, to identify videos. The web crawler 540 may be considered as a web agent, a web bot, a web robot, a web spider, or other program which orders information found across the web. The crawler 540 may traverse a series of web sites 550 to collect information on videos. A database 542 may store the video information which was collected. The videos themselves may be stored in the database 542 or information on the videos, including where the videos may be retrieved. The crawler 540 may also traverse various live video 552 feeds and dedicated content 554 providers. In some embodiments, the crawler 540 may obtain information from a social network which includes videos or links to videos.

The requester 510 may send the location 526 obtained from the content controller 520 to a video streamer 530 as a stream request 558. In some embodiments, the video identifiers provided with the location 526 may be analyzed by the requester 510. In some embodiments, the requester may choose a subset of the videos associated with the video identifiers to send in the stream request 558 to the video streamer 530. The video streamer 530 may have one or more processors 532 which may execute instructions stored in one or more memories 534. The memory 534 may be used for storing instructions, for temporary storage, for system support, and the like. The video streamer 530 may obtain videos from databases 542, live video 552 feeds, and dedicated content 554 sources as well as other locations. The video streamer 530 may aggregate a plurality of active videos into a single video stream to provide a composite video as a video 556 to the requester 510, which may be a client machine. So in some embodiments, the single stream is received on a client machine. In some embodiments, the composite video is dynamically generated by the video streamer as the composite video is being sent, although, in other embodiments the composite video may be generated and stored for later use. One or more of the plurality of active videos may include a live feed video such as a news broadcast or sporting event.

Figure 6:
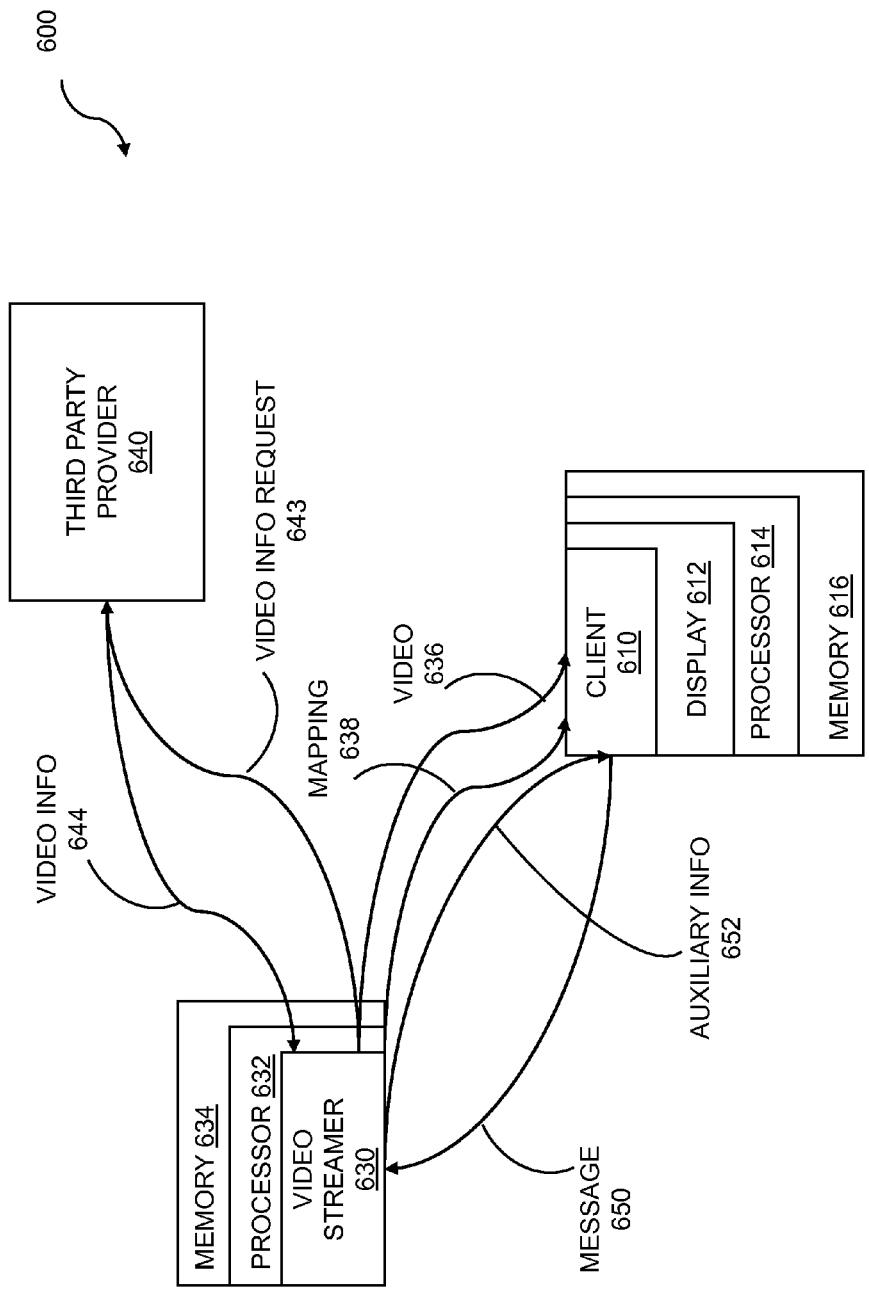
FIG. 6 is a system diagram showing server to third party interaction.

FIG. 6 is a system diagram showing server to third party interaction. A system 600 includes a client 610, a server or video streamer 630, and a third party provider 640 which may be a second server. A client 610 may be a computer system to present video or any type of electronic device capable of presenting video. The client 610 may have one or more viewers or users who view videos on one or more displays 612. The client 610 may include one or more processors 614 attached to the memory 616 which may execute instructions stored in the memory 616.

In some embodiments the server includes the video streamer 630, and may have one or more processors 632 which may execute instructions stored in one or more memories 634. The memory 634 may be used for storing instructions, for temporary storage, for system support, and the like. The video streamer 630 may obtain videos from various locations and create a composite video. The video streamer 630 may send the composite video as a single video stream 636 to the client 610. The video streamer may also send a translation mapping 638, so that a method using system 600 that includes receiving, by the client 610 from the server 630, a translation mapping, may be implemented. In some embodiments, translations are preformed at the video streamer 630.

The video streamer 630 may send a video information request 643 to a third party provider 640 over a network, to gather information about the various videos that are aggregated into the composite video. The third party provider may be an internet resource such as the internet movie database (www.imdb.com), Wikipedia (en.wikipedia.com), or some other network accessible information store. The third party provider 640 may respond to the video information request 643 by sending video information 644 to the video streamer 630, which may store the video information 644 for later use. The video information 644 may be any type of information related to a video including, but not limited to, a URL, another video, a group of videos, an advertisement, social media, a search query, a purchase page, information on a character, information on a place, information on a product, information on a service, a commentary on a video, statistics on a sporting event, and statistics on an athlete.

A viewer may make a selection in the composite video while watching the video 636 using a mouse, keyboard, and/or touch screen, which may cause the client 610 to send a message 650 to the video streamer 630. The message may include information about the selection and/or an absolute media reference related to the selected video. In at least one embodiment the selection may measure an elapsed time since the start of the composite video which may be used locally in the client 610 or may be sent in the message 650. At least one embodiment of a method using system 600 includes translating, by the client 610, from a composite video reference to an absolute media reference using the translation mapping 638. The composite video reference may include an elapsed time and the absolute media reference may include an absolute media time. The composite video reference may include a spatial coordinate from the composite video and the absolute media reference may include an absolute spatial coordinate. In some embodiments, the composite video reference may include both an elapsed time and a spatial coordinate from the composite video. Further, the absolute media reference may include both an absolute media time and an absolute spatial coordinate. The message may include information about the selection that is translated by the video streamer 630 to an absolute media reference, such as an absolute media time.

Once the video streamer 630 has received the message 650, the video streamer 630 may determine which auxiliary information to send to the client 610. In some embodiments the message 650 includes an absolute media reference that can be used for a database query to retrieve the auxiliary information from a local database where video information from third party providers 640 has been stored. In some embodiments, the video streamer 630 may send the video information request 643 after the message 650 is received. Once the auxiliary information has been gathered by the video streamer 630, the auxiliary information 652 may be sent to the client 610, hence, at least in some embodiments, the auxiliary information is obtained by a client-server interaction. The auxiliary information may be presented on the display 612 and may be presented in the midst of tiles showing videos.

Figure 7:
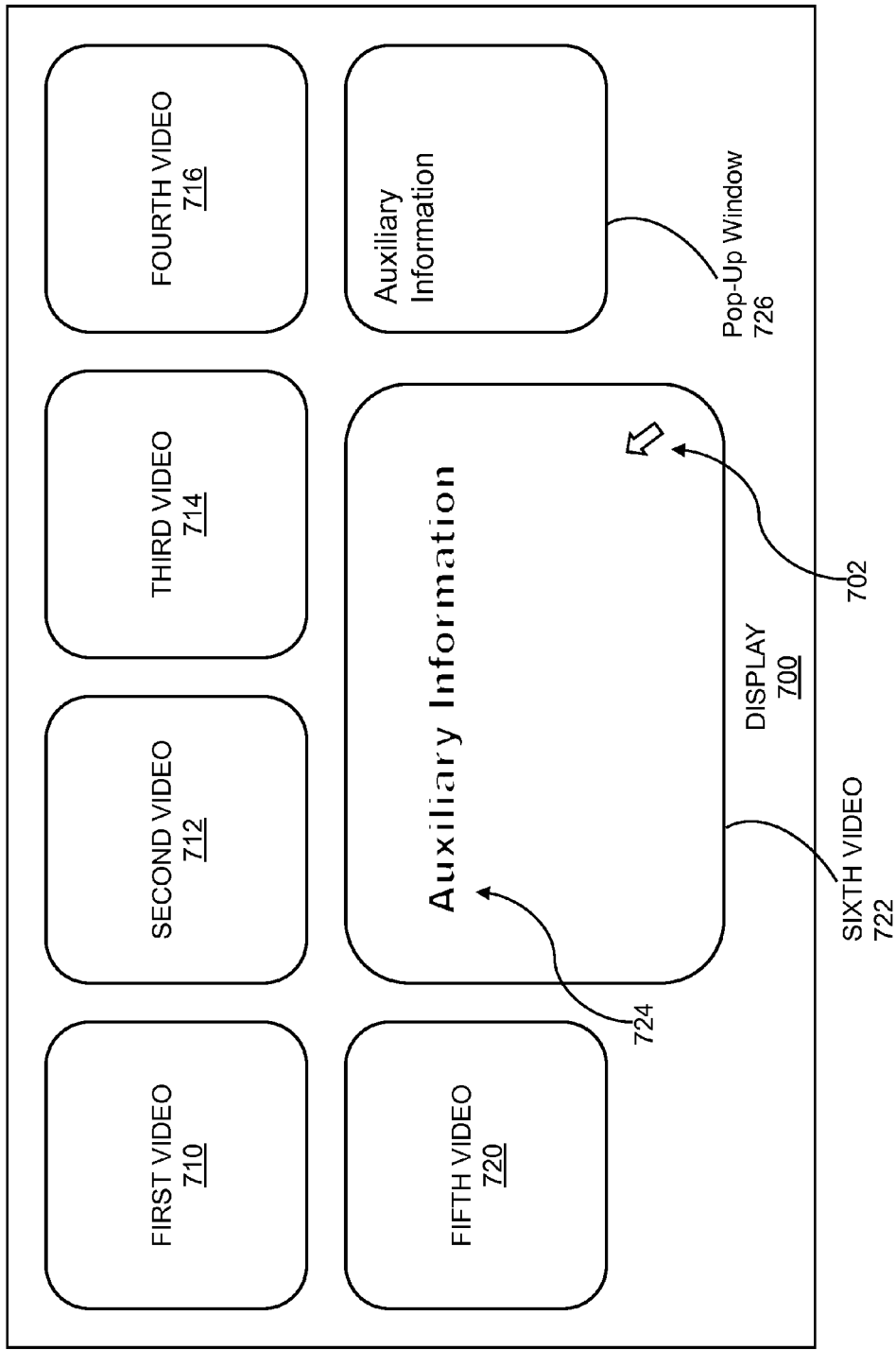
FIG. 7 is a diagram of example video presentation tiles.

FIG. 7 is a diagram of example video presentation tiles. A display 700 is shown with a cursor 702 under control of a human input device, and a first video 710, a second video 712, a third video 714, a fourth video 716, a fifth video 720, and a sixth video 722 from the composite video being displayed in separate tiles. The display 700 may presenting the composite video on an electronic display such as a computer display, a laptop screen, a net book screen, a tablet computer, a cell phone display, a mobile device display, a television, or some other electronic display. The display 700 may include multiple windows, a single window taking only a portion of the display 700, or may function in a full-screen mode. In the embodiment shown, a composite video is being presented in full-screen mode where the composite video has multiple tiles showing active video with motion. Other embodiments may show the composite video in a window on the display 700. Various numbers of tiles are possible depending on the composite video.

A user may use the human input device to make a selection regarding one of the videos. In various embodiments, the selection includes one of a user clicking on and the user mousing over, a presentation of the composite video on an electronic display. As described earlier, the selection may be used to obtain auxiliary information related to the composite video. Once the auxiliary information has been obtained, it may be presented in various ways in various embodiments. In one embodiment, the auxiliary information is presented as text 724 overlaid on at least one video 722 of the composite video. In another embodiment, the auxiliary information is presented in a pop-up window 726.

Figure 8:
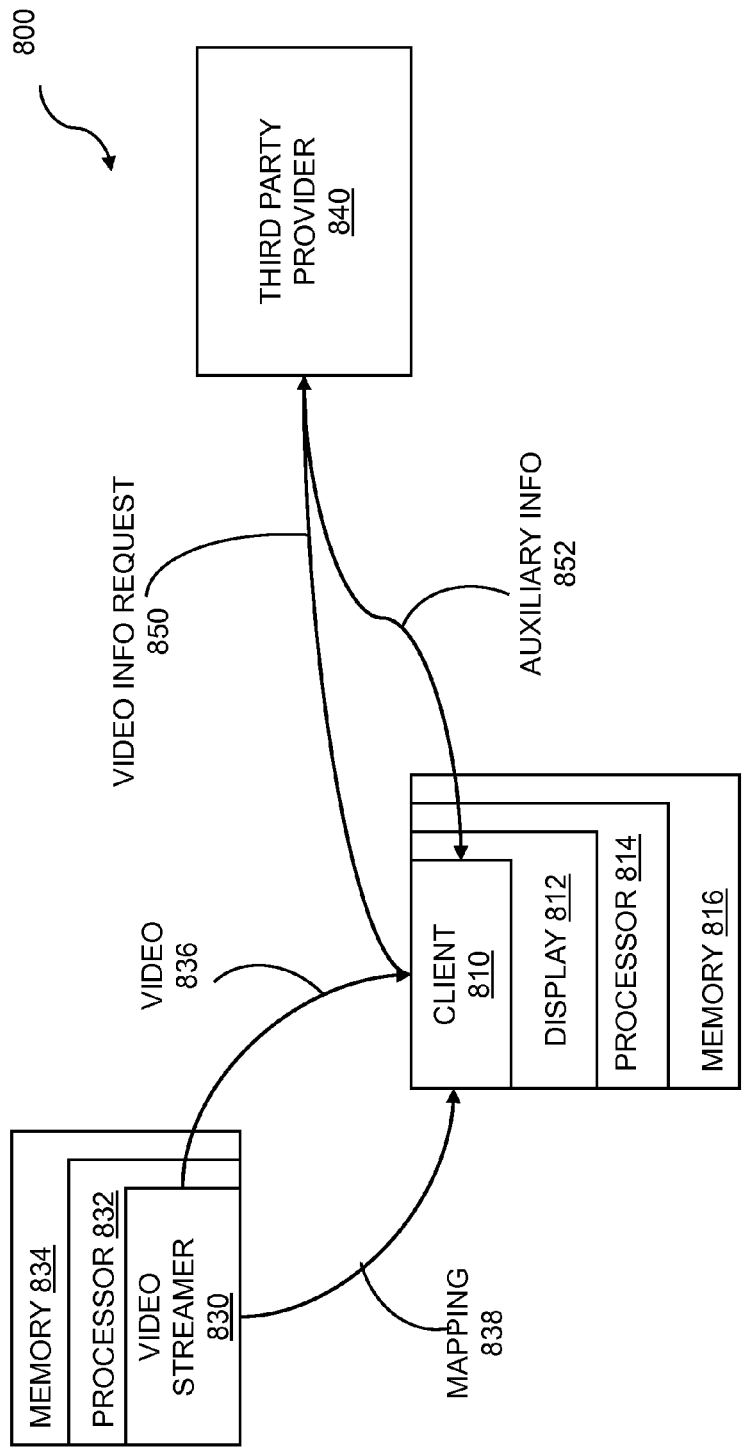
FIG. 8 is a system diagram showing client to third party interaction.

FIG. 8 is a system diagram showing client to third party interaction. A system 800 includes a client 810, a video streamer 830, and a third party provider 840 similar to the system 600 shown in FIG. 6. The client 810 may have one or more viewers or users who view videos on one or more displays 812. The client 810 may include one or more processors 814 attached to the memory 816 which may execute instructions stored in the memory 816. The video streamer 830, and may have one or more processors 832 which may execute instructions stored in one or more memories 834. The video streamer 830 may create a composite video and send it as a single video stream 836 to the client 810. The video streamer 830 may also send a translation mapping 838, to provide the client 810 with information about the content of the composite video.

A viewer may make a selection in the composite video using a mouse, keyboard, and/or touch screen while watching the video 836. The client 810 may use the translation mapping 838 to translate the selection to an absolute media reference. The client 810 may then send a video information request 850 to the third party provider 840, which may be hosted on a second server. The third party provider 840, such as the third party providers 640 discussed earlier, may use the absolute media reference to query various databases to find auxiliary information related to the selected video. The third party provider 840 may send the auxiliary information 852 to the client 810. Thus, in at least some embodiments, the obtaining the auxiliary information 852 comprises a request by client 810 to the second server 840 and may include obtaining, from a second server, the auxiliary information. The auxiliary information may then be presented on the display 812. The auxiliary information presentation may be in the same window as the composite videos or may be in a separate window.

Each of the above methods may be executed on one or more processors on one or more computer systems. Embodiments may include various forms of distributed computing, client/server computing, and cloud based computing. Further, it will be understood that for each flow chart in this disclosure, the depicted steps or boxes are provided for purposes of illustration and explanation only. The steps may be modified, omitted, or re-ordered and other steps may be added without departing from the scope of this disclosure. Further, each step may contain one or more sub-steps. While the foregoing drawings and description set forth functional aspects of the disclosed systems, no particular arrangement of software and/or hardware for implementing these functional aspects should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. Each element of the block diagrams and flowchart illustrations, as well as each respective combination of elements in the block diagrams and flowchart illustrations, illustrates a function, step or group of steps of the methods, apparatus, systems, computer program products and/or computer-implemented methods. Any and all such functions may be implemented by computer program instructions, by special-purpose hardware-based computer systems, by combinations of special purpose hardware and computer instructions, by combinations of general purpose hardware and computer instructions, by a computer system, and so on. Any and all of which may be generally referred to herein as a "circuit," "module," or "system."

A programmable apparatus that executes any of the above mentioned computer program products or computer implemented methods may include one or more processors, microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are not limited to applications involving conventional computer programs or programmable apparatus that run them. It is contemplated, for example, that embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized. The computer readable medium may be a non-transitory computer readable medium for storage. A computer readable storage medium may be electronic, magnetic, optical, electromagnetic, infrared, semiconductor, or any suitable combination of the foregoing. Further computer readable storage medium examples may include an electrical connection having one or more wires, a portable computer diskette, a hard disk, a random access memory (RAM), a read-only memory (ROM), an erasable programmable read-only memory (EPROM), Flash, MRAM, FeRAM, phase change memory, an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. Each thread may spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the entity causing the step to be performed.

While the invention has been disclosed in connection with preferred embodiments shown and described in detail, various modifications and improvements thereon will become apparent to those skilled in the art. Accordingly, the spirit and scope of the present invention is not to be limited by the foregoing examples, but is to be understood in the broadest sense allowable by law.

What is claimed is:

1. A computer implemented method of video presentation comprising:
   receiving a single elementary stream from a video streamer wherein the single elementary stream includes a composite video;
   showing the composite video in a window, wherein the composite video comprises a spatial composite video that includes a first tile and a second tile;
   receiving a selection with regards to the composite video;
   receiving, as at least a portion of the selection, a spatial coordinate based on the window, and a time of the selection;
   translating the selection to an absolute media reference;
   providing auxiliary information based on the selection and the absolute media reference wherein the absolute media reference identifies:
      a particular video within the composite video,
      an absolute media spatial coordinate to identify a particular pixel or area of the particular video within the composite video that was selected, and
      an absolute media time to provide a time from a start of the particular video within the composite video to a time of the selection;
   showing a temporal composite video that includes the particular video in the first tile, wherein the particular video has a start time that is different than a start time of the composite video;
   showing an additional video in the second tile, wherein the particular video and the additional video are simultaneously active; and
   receiving a translation mapping, wherein the translating the selection to the absolute media reference comprises:
      identifying the particular video based on the translation mapping, the spatial coordinate, and the time of the selection;
      translating, based on the translation mapping, the spatial coordinate to the absolute media spatial coordinate within the particular video; and
   translating, based on the translation mapping, the time of the selection to the absolute media time within the particular video.

2. The method of claim 1 wherein the composite video includes at least one of a temporal composite video and a spatial composite video.

3. The method of claim 1 wherein the auxiliary information is based on both the particular video and the absolute media spatial coordinate.

4. The method of claim 1 wherein the single elementary stream includes a non-linear playback of video content.

5. The method of claim 1 wherein the auxiliary information is based on both the particular video and the absolute media time.

6. The method of claim 1 wherein the auxiliary information is obtained by a client-server interaction.

7. The method of claim 6 wherein the client-server interaction comprises:
   receiving, by a server, a message including information based on the selection, wherein the translating is accomplished using the server and the information based on the selection;
   obtaining, by the server, the auxiliary information from a second server based on the absolute media reference; and
   providing, by the server, the auxiliary information to a client.

8. The method of claim 7 wherein the information in the message includes an elapsed time across a sequence of videos from the composite video.

9. The method of claim 8 wherein the composite video includes a non-linear playback of at least one video.

10. The method of claim 7 wherein the information in the message includes a spatial coordinate from the composite video.

11. The method of claim 6 wherein the client-server interaction comprises:
   receiving, by a client from a server, a translation mapping;
   translating, by the client, from a composite video reference to the absolute media reference using the translation mapping; and
   obtaining, from a second server, the auxiliary information.

12. The method of claim 11 wherein the composite video reference includes an elapsed time and the absolute media reference includes an absolute media time.

13. The method of claim 11 wherein the composite video reference includes a spatial coordinate from the composite video and the absolute media reference includes an absolute spatial coordinate.

14. The method of claim 11 wherein the obtaining the auxiliary information comprises a request by the client to the second server.

15. The method of claim 1 wherein the auxiliary information includes at least one of a URL, social media, a purchase page, information on a character, information on a service, a commentary on a video, statistics on a sporting event, and statistics on an athlete.

16. The method of claim 1 further comprising performing an action based on the selection and the absolute media reference.

17. The method of claim 16 wherein the action includes providing a purchase page.

18. The method of claim 1 wherein the composite video is dynamically generated by the video streamer.

19. The method of claim 1 wherein the auxiliary information is based on the particular video, the absolute media spatial coordinate, and the absolute media time.

20. The method of claim 1 wherein the translation mapping includes information about a spatial arrangement of the first tile and the second tile within the composite video, and time information related to the particular video.

21. The method of claim 20 wherein the time information related to the particular video includes a playlist for the temporal composite video shown in the first tile, the playlist comprising a time duration for the particular video.

22. The method of claim 21 wherein the identifying the particular video includes determining a video identifier for the particular video based on:
the spatial coordinate;
the time of the selection;
the playlist; and
the information about the spatial arrangement of the first tile and the second tile within the composite video.

23. The method of claim 22 wherein the translating the time of the selection to the absolute media time comprises:
determining a first offset from a start of the composite video to the time of the selection;
calculating a repeat time for the playlist as a sum of time durations for videos in the playlist, including the time duration for the particular video;
calculating a second offset for a start time of the particular video from a beginning of the playlist by summing time durations for videos appearing in the playlist before the particular video, wherein the second offset is calculated to be 0 if the particular video is identified as a first video in the playlist;
determining a number of repeats of the playlist before the time of the selection based on the repeat time and the first offset;
calculating a third offset by multiplying the repeat time by the number of repeats; and
calculating the absolute media time by subtracting both the second offset and the third offset from the first offset.

24. The method of claim 23 wherein the auxiliary information is based on the video identifier, the absolute media spatial coordinate, and the absolute media time.

25. A computer implemented method of video presentation comprising:
providing, to a client, a single elementary stream wherein the single elementary stream includes a composite video;
showing the composite video in a window, wherein the composite video comprises a spatial composite video that includes a first tile and a second tile;
receiving, from the client, a message including information based on a selection made on the client;
receiving, as at least a portion of the selection, a spatial coordinate based on the window, and a time of the selection;
translating the information included in the message to an absolute media reference;
providing auxiliary information, to the client, based on the message and the absolute media reference wherein the absolute media reference identifies a particular video within the composite video, an absolute media spatial coordinate to identify a particular pixel or area of the particular video within the composite video that was selected, and an absolute media time to provide a time from a start of the particular video within the composite video to a time of the selection;
showing a temporal composite video that includes the particular video in the first tile, wherein the particular video has a start time that is different than a start time of the composite video;
showing an additional video in the second tile, wherein the particular video and the additional video are simultaneously active; and
receiving a translation mapping, wherein the translating the selection to the absolute media reference comprises:
identifying the particular video based on the translation mapping, the spatial coordinate, and the time of the selection;
translating, based on the translation mapping, the spatial coordinate to the absolute media spatial coordinate within the particular video; and
translating, based on the translation mapping, the time of the selection to the absolute media time within the particular video.

26. A computer program product to present video, the computer program product embodied in a non-transitory computer readable medium, the computer program product comprising code which causes one or more processors to perform operations of:
receiving a single elementary stream from a video streamer wherein the single elementary stream includes a composite video;
showing the composite video in a window, wherein the composite video comprises a spatial composite video that includes a first tile and a second tile;
receiving a selection with regards to the composite video;
receiving, as at least a portion of the selection, a spatial coordinate based on the window, and a time of the selection;
translating the selection to an absolute media reference;
providing auxiliary information based on the selection and the absolute media reference wherein the absolute media reference identifies a particular video within the composite video, an absolute media spatial coordinate to identify a particular pixel or area of the particular video within the composite video that was selected, and an absolute media time to provide a time from a start of the particular video within the composite video to a time of the selection;
showing a temporal composite video that includes the particular video in the first tile, wherein the particular video has a start time that is different than a start time of the composite video;
showing an additional video in the second tile, wherein the particular video and the additional video are simultaneously active; and
receiving a translation mapping, wherein the translating the selection to the absolute media reference comprises:
identifying the particular video based on the translation mapping, the spatial coordinate, and the time of the selection;
translating, based on the translation mapping, the spatial coordinate to the absolute media spatial coordinate within the particular video; and translating, based on the translation mapping, the time of the selection to the absolute media time within the particular video.

27. A computer system to present video comprising:
a memory which stores instructions;
one or more processors attached to the memory wherein the one or more processors, when executing the instructions which are stored, are configured to:
- receive a single elementary stream from a video streamer wherein the single elementary stream includes a composite video;
- show the composite video in a window, wherein the composite video comprises a spatial composite video that includes a first tile and a second tile;
- receive a selection with regards to the composite video;
- receive, as at least a portion of the selection, a spatial coordinate based on the window, and a time of the selection;
- translate the selection to an absolute media reference;
- provide auxiliary information based on the selection and the absolute media reference wherein the absolute media reference identifies a particular video within the composite video, an absolute media spatial coordinate to identify a particular pixel or area of the particular video within the composite video that was selected, and an absolute media time to provide a time from a start of the particular video within the composite video to a time of the selection;
- show a temporal composite video that includes the particular video in the first tile, wherein the particular video has a start time that is different than a start time of the composite video;
- show an additional video in the second tile, wherein the particular video and the additional video are simultaneously active; and
- receive a translation mapping, wherein the selection which is translated to the absolute media reference comprises:
  - identifying the particular video based on the translation mapping, the spatial coordinate, and the time of the selection;
  - translating, based on the translation mapping, the spatial coordinate to the absolute media spatial coordinate within the particular video; and
  - translating, based on the translation mapping, the time of the selection to the absolute media time within the particular video.

* * * * *